US012303438B2

(12) United States Patent
Moore et al.

(10) Patent No.: US 12,303,438 B2
(45) Date of Patent: May 20, 2025

(54) MULTI-FUNCTION MOBILITY DEVICE

(71) Applicant: TOYOTA MOTOR NORTH AMERICA, INC., Plano, TX (US)

(72) Inventors: Douglas A. Moore, Fairview, TX (US); Paul Nichols, Healdsburg, CA (US); Thomas Mitchell Dair, Lafayette, CA (US)

(73) Assignee: Toyota Motor North America, Inc., Plano, TX (US)

( * ) Notice: Subject to any disclaimer, the term of this patent is extended or adjusted under 35 U.S.C. 154(b) by 894 days.

(21) Appl. No.: 17/097,818

(22) Filed: Nov. 13, 2020

(65) Prior Publication Data

US 2022/0151845 A1 May 19, 2022

(51) Int. Cl.

*A61G 5/04* (2013.01)
*A61G 5/08* (2006.01)
*A61G 5/12* (2006.01)

(52) U.S. Cl.

CPC ............... *A61G 5/04* (2013.01); *A61G 5/085* (2016.11); *A61G 5/127* (2016.11)

(58) Field of Classification Search

CPC ........ A61G 5/04; A61G 5/127; A61G 5/0875; A61G 5/0833; A61G 5/085; A61G 5/0866; A61G 5/0883; A61G 5/107; A61G 5/047

USPC .................................. 180/208; 280/641–643

See application file for complete search history.

(56) References Cited

U.S. PATENT DOCUMENTS

| | | | | |
|---|---|---|---|---|
| 4,951,766 | A * | 8/1990 | Basedow | A61G 5/045 180/907 |
| 6,378,883 | B1 | 4/2002 | Epstein | |
| 6,886,851 | B2 * | 5/2005 | Chen | B62B 7/10 280/47.38 |
| 7,410,187 | B2 * | 8/2008 | Hartenstine | B62B 7/10 280/47.38 |
| 9,056,622 | B2 * | 6/2015 | Thomas | B62B 7/008 |
| 9,060,909 | B1 * | 6/2015 | Gao | A61G 5/045 |
| 9,854,203 | B2 | 12/2017 | Benetti et al. | |
| 10,765,586 | B2 * | 9/2020 | Liang | A61H 1/00 |
| 11,382,821 | B2 * | 7/2022 | Liang | A61H 1/00 |
| 11,642,258 | B2 * | 5/2023 | Moore | A61G 5/04 180/6.5 |
| 11,648,171 | B2 * | 5/2023 | Moore | A61G 5/0866 135/66 |

(Continued)

FOREIGN PATENT DOCUMENTS

| | | |
|---|---|---|
| CN | 106389024 A | 2/2017 |
| CN | 106864650 A | 6/2017 |
| WO | 2015059662 A1 | 4/2015 |

*Primary Examiner* — Anne Marie M Boehler
(74) *Attorney, Agent, or Firm* — Dinsmore & Shohl LLP

(57) ABSTRACT

A multifunction mobility device includes a frame that includes a seat member, a first wheeled leg ember coupled to a first side of the seat member and a second wheeled leg member coupled to a second side of the seat member. The first wheeled leg member and the second wheeled leg member each includes an upper leg portion pivotally coupled to the seat member at a distal end and defining an upper arm recess, and a lower leg portion pivotally coupled to the upper leg portion, the upper leg portion and the lower leg portion being collapsible into a collapsed transport and storage mode where the upper leg portion is pivoted relative to the lower leg portion such that the lower leg portion nests into the upper arm recess.

20 Claims, 9 Drawing Sheets

(56) References Cited

U.S. PATENT DOCUMENTS

| | | | | |
|---|---|---|---|---|
| 11,648,971 | B2 * | 5/2023 | Stewart | B62B 3/106 280/651 |
| 2011/0204591 | A1 | 8/2011 | Gerster | |
| 2020/0008990 | A1 | 1/2020 | Harrison | |
| 2022/0151845 | A1 * | 5/2022 | Moore | A61G 5/04 |
| 2022/0279908 | A1 * | 9/2022 | Williams | A61G 5/085 |

* cited by examiner

MULTI-FUNCTION MOBILITY DEVICE

TECHNICAL FIELD

The present specification generally relates to a multifunction mobility device and, more specifically, a multi-function mobility device that is configurable in a variety of travel and/or storage modes.

BACKGROUND

A person in need of physical assistance may use mobility devices such wheelchairs, walkers, scooters, or the like to perform everyday tasks such as moving from one place to another, reaching for objects, changing clothes, and the like. Additionally, some individuals may use more than one mobility device depending on a specific task at hand. For example, a person may use a wheelchair to travel longer distances but may also use a walker device to walk shorter distances. However, storing multiple mobility devices may be space prohibitive due to the size and/or shape of each of the multiple devices.

Accordingly, a need exists for alternative mobility devices which may be reconfigured to function as different types of mobility devices.

SUMMARY

In one embodiment, a multifunction mobility device includes a frame that includes a seat member, a first wheeled leg ember coupled to a first side of the seat member and a second wheeled leg member coupled to a second side of the seat member. The first wheeled leg member and the second wheeled leg member each includes an upper leg portion pivotally coupled to the seat member at a distal end and defining an upper arm recess, and a lower leg portion pivotally coupled to the upper leg portion, the upper leg portion and the lower leg portion being collapsible into a collapsed transport and storage mode where the upper leg portion is pivoted relative to the lower leg portion such that the lower leg portion nests into the upper arm recess.

In another embodiment, a multifunction mobility devices includes a frame, one or more actuators, and a control unit. The frame is configurable between a plurality of modes and includes a seat member, a first wheeled leg member coupled to a first side of the seat member, and a second wheeled leg member coupled to a second side of the seat member. Each of the first wheeled leg member and the second wheeled leg member includes an upper leg portion pivotally coupled to the seat member at a distal end and defining an upper arm reces, and a lower leg portion pivotally coupled to the upper leg portion, the upper leg portion and the lower leg portion being collapsible into a collapsed transport and storage mode, wherein the upper leg portion is pivoted with respect to the lower leg portion such that the lower leg portion nests into the upper arm recess. The one or more actuators transitions the frame between the plurality of modes, and the control unit is communicatively coupled to the one or more actuators, wherein the control unit is configured to operate the one or more actuators to transition the frame between the plurality of modes including the collapsed transport and storage mode.

In yet another embodiment, a multifunction mobility device includes a frame that is configurable between a plurality of modes including at least a power wheelchair mode, a power walker mode, and a power scooter mode, one or more actuators coupled to the frame, and a control unit communicatively coupled to the one or more actuators, wherein the control unit is configured to operate the one or more actuators to transition the frame into each mode. The frame includes a seat member, a first wheeled leg member coupled to a first side of the seat member, and a second wheeled leg member coupled to a second side of the seat member. Each of the first wheeled leg member and the second wheeled leg member includes an upper leg portion pivotally coupled to the seat member at a distal end and defining an upper arm recess, and a lower leg portion pivotally coupled to the upper leg portion, the upper leg portion and the lower leg portion being collapsible into a collapsed transport and storage mode, wherein the upper leg portion is pivoted relative to the lower leg portion to nest the lower leg portion into the upper arm recess.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
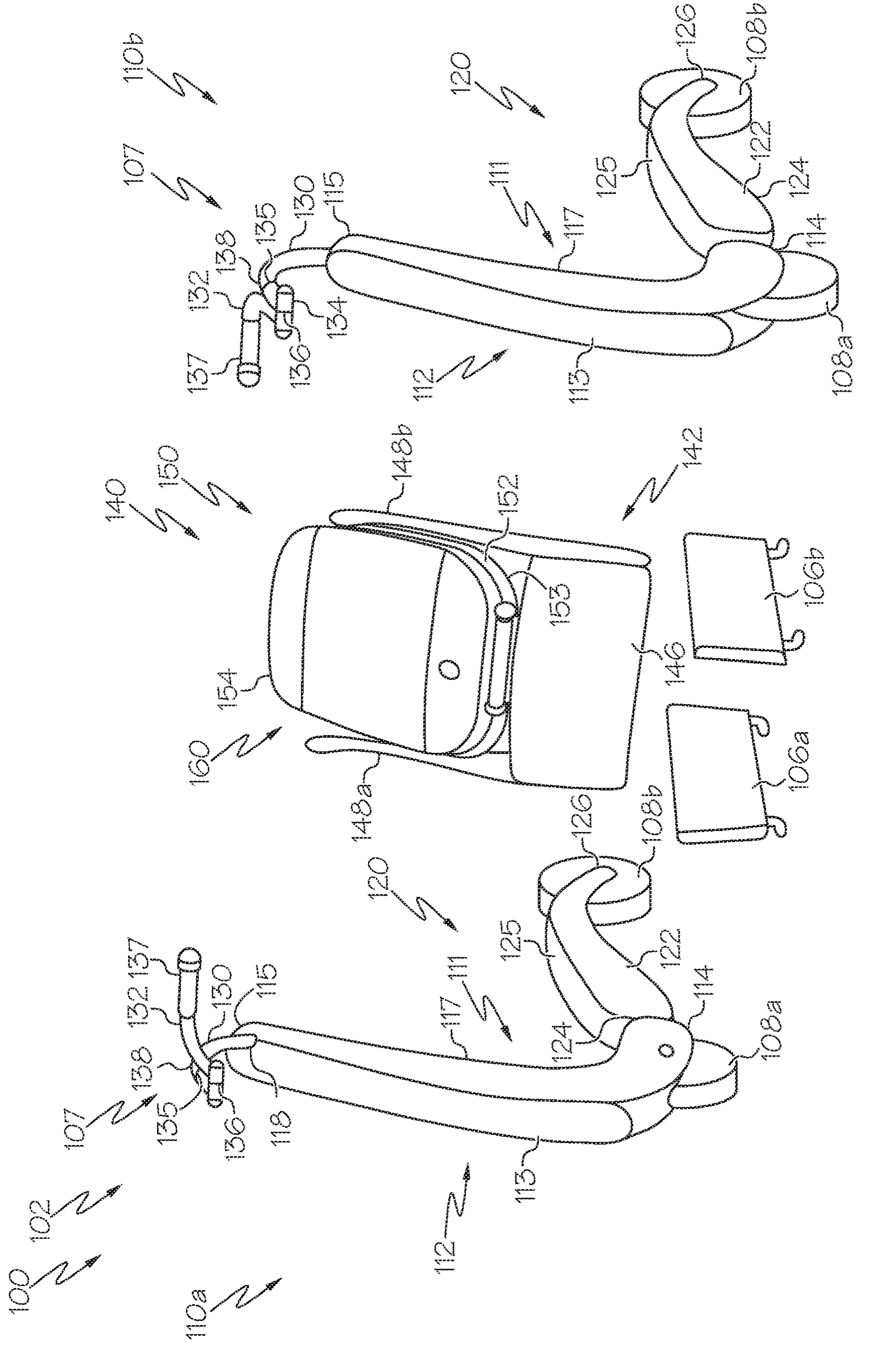
FIG. 1 depicts an exploded view of a multifunction mobility device according to one or more embodiments shown and described herein.

A person may need various types of mobility devices for a variety of reasons, particularly when a person's mobility is compromised. Mobility devices such as wheelchairs, scooters, and walkers provide much needed assistance, but have limitations in terms of what they can provide, particularly individually. Furthermore, users may be limited to the number of mobility devices they can store and/or purchase. Accordingly, having a mobility device that already provides the mobility functionality of wheelchairs, scooters, walkers, etc. may be very beneficial.

Embodiments of the present disclose are directed to multifunction mobility devices that are reconfigurable between a plurality of different configurations or modes. For example, a multifunction mobility device according to the present disclosure may transform between, a collapsed transport and storage mode, a power wheelchair mode, a power walker/telepresence mode, a power scooter mode, and/or a cargo transport mode. Having such modes all within one device advantageously saves users from having to purchase and store many different mobility devices.

Referring generally to the figures, to facilitate transformation between the various modes, the multifunction mobility device may include a frame that is reconfigurable between the plurality of modes. The frame may include a seat member, a first wheel leg module coupled to a first side of the seat member, and a second wheeled leg member coupled to the second side of the seat member. Each of the first wheeled leg member and the second wheeled leg member may include an upper leg portion pivotally coupled to the seat member at a distal end and defining an upper arm recess and a lower leg portion pivotally coupled to the upper leg portion. When in the collapsed transport and storage mode, the upper leg portion and/or the lower leg portion lower are pivoted with respect to one another such that the lower leg portion nests into the upper arm recess. This allows the wheel chair to have a collapsed transport and storage mode with a small side profile, which may provide for increased ability for users to easily store the multifunction mobility device. Such small configuration also makes it easier to store the multifunction mobility device during travel (e.g., with a trunk of a vehicle, in an overhead compartment of an airplane, or the like). By providing a multifunction mobility device that may be easily stored and that transforms to various types of mobility devices, it may be easier for a user to house and/or use the various types of mobility devices they may need to live their lives to the fullest.

Additionally, multifunction mobility devices according to the present disclosure may include handles used to drive and/or steer the multifunction mobility device during use in each of the various modes. Such handles may be independently manipulated or pivoted to allow a user to drive the multifunction mobility device. For example, steering the multifunction mobility device may be similar to steering a zero-turn mower or similar device. Moreover, the handles may be adjustable, for example automatically adjusted, to a different position for each mode of the multifunction mobility device, ensuring comfort and ease of use for the user.

Referring now to FIG. 1 an exploded view of a multifunction mobility device 100 is schematically depicted. A multifunction mobility device 100 generally includes a frame 102 that includes a first wheeled leg member 110*a*, a second wheeled leg member 110*b*, and a seat member 140. The frame 102 may further include a first foot plate 106*a* and a second foot plate 106*b*. The various portions of the frame 102 may be assembled together and positioned relative to one another such as to provide various traveling and/or transportation modes, each of which will be described in greater detail herein. For example, FIGS. 2A-6B illustrated the multifunction mobility device 100 in various assembled modes.

The first wheeled leg member 110*a* and the second wheeled leg member 110*b* may be substantially identical to one another or substantially mirror one another. Accordingly, description of a wheeled leg member applies to each of the first wheeled leg member 110*a* and the second wheeled leg member 110*b*, unless otherwise noted or apparent. A wheeled leg member generally includes an upper leg portion 112 and a lower leg portion 120 pivotally coupled to one another. Each wheeled leg member 110*a*, 110*b* may include one or more wheels 108*a*, 108*b* such as a plurality of wheels mounted thereto. In embodiments, a plurality of wheels may be mounted to each wheeled leg member 110*a*, 110*b*, and one or more of the plurality of wheels may be motorized wheels.

The upper leg portion 112 may have an elongate body 113 that extends between a first end 114 (also referred to as a proximal end) and a second end 115 (also referred to as a distal end). Formed within or by the elongate body 113 may be an upper arm recess 111. The upper arm recess 111 may be defined via a curved wall 117 that extends between the first end 114 and the second end 115. A handle opening 118 may be formed at the first end 114 for receiving a handle 107, such that each of the first wheeled leg member 110*a* includes a first handle and the second wheeled leg member 110*b* include a second handle, as will be described in greater detail herein. The upper leg portion 112 may further include a wheel such as a first wheel 108*a* rotatably coupled to the second end 115 of the upper leg portion 112. In embodiments the first wheel 108*a* may be a motorized wheel.

The lower leg portion 120 may also generally have an elongate body 122 that extends between a first end 124 and a second end 126. The elongate body 122 may be curved or define a curved upper surface 125. The first end 124 of the lower leg portion 120 may be pivotally coupled to the second end 115 of the upper leg portion 112. As will be described in further detail below, the upper and lower leg portions 112, 120 may be pivoted with respect to one another to transition the multifunction mobility device 100 between the plurality of modes. For example, in the collapsed transport and storage mode 100E (illustrated in FIGS. 6A and 6B), the lower leg portion 120 nests into the upper arm recess 111, thereby providing a low-profile collapsed transport and storage mode 100E. For example, the curved upper surface 125 may be shaped and sized such that when the upper leg portion 112 pivots down over the lower leg portion 120, the curved upper surface 125 mates or is positioned in close approximation to the curved wall 117 of the upper leg portion 112. Still referring to FIG. 1, a second wheel 108*b*, such as a motorized wheel, may be rotatably coupled to the second end 126 of the lower leg portion 120.

A handle 107 may be coupled to each upper leg portion 112. For example, the handle 107 may be positioned at least partially within the handle opening 118. Each handle 107 which may include at least one control member (button, switch, toggle, lever, etc.) for operating the multifunction mobility device 100 such as, for example, powering on or off the multifunction mobility device 100, controlling a speed and/or direction of the multifunction mobility device 100, and/or transitioning between operating modes of the multifunction mobility device 100. The handles 107 may also be configured to transition with respect to each of the modes. In some embodiments, such transitions may be manual or automated. Accordingly, the same handles may be used to operate the multifunction mobility device 100 without need for replacement.

Each handle 107 may generally include a plurality of bar portions coupled to one another via a plurality of joints. For example, and in the illustrated embodiment, a handle 107 includes a base bar portion 130 and a handle bar portion 132 coupled to one another via one another via a rotational joint portion 134. The handles 107 may further include one or more handle actuators 209 (schematically depicted in FIG. 7) that are configured to rotate, extend, and/or position various portions of the handle 107 when being transformed between different modes.

The base bar portion 130 may be positioned within the handle opening 118 of the upper leg portion 112. In some embodiments, the base bar portion 130 may be slidable within the handle opening 118 so as to be able to slide between retracted and extended positions. For example, the one or more handle actuators 209 may include a linear actuator (not shown) coupled to the base bar portion 130. The linear actuator may be operated to slide the base bar portion 130 into and out of the handle opening 118 to a desired position or a position corresponding to one of the plurality of modes noted herein. In some embodiments, the one or more handle actuators 209 may include a rotation actuator coupled to the base bar portion 130. The rotation actuator may be operated to rotate the base bar portion 130 within the handle opening 118 to a desired position and/or to a position corresponding to one of the plurality of modes. In embodiments, the base bar portion 130 may have a curved end 138 at which the rotational joint portion 134 and the handle bar portion 132 are coupled.

For example, the handle bar portion 132 may be coupled to the curved end 138 of the base bar portion 130 via the rotational joint portion 134. The handle bar portion 132 may also a grip portion 137, which a user may grasp. The handle bar portion 132 may be rotatable relative to the base bar portion 130 between the plurality of modes and/or to drive the multifunctional mobility device, as will be described in greater detail below.

The rotational joint portion 134 may be rotatably coupled to the base bar portion 130 and the handle bar portion 132 such that the rotational joint portion 134 rotatably couples the base bar portion 130 to the handle bar portion 132. For example, the rotational joint portion 134 may define a first rotational joint 135 between the base bar portion 130 and the rotational joint portion 134 and a second rotational joint 136 between the rotational joint portion 134 and the handle bar portion 132. The one or more handle actuators 209 (schematically depicted in FIG. 7) may include one or more rotational actuators associated with each joint 135, 136. The one or more rotational joint actuators may be controlled, e.g., via a control unit 202 (schematically depicted in FIG. 7), to rotate the handle bar portion 132 relative to the base bar portion 130 about the first rotational joint 135, the second rotational joint 136, or a combination thereof. The various positioned of the handles 107 will be described in greater detail below with respect to each of the modes described herein.

While it is contemplated that motion of the handles may be automated, in some embodiments, a user may manually rotate the handle bar portion 132 and/or the base bar portion 130 to a desired position and lock the handle 107 in the desired position (e.g., via detents, latches, and/or other catch mechanisms).

Figure 7:
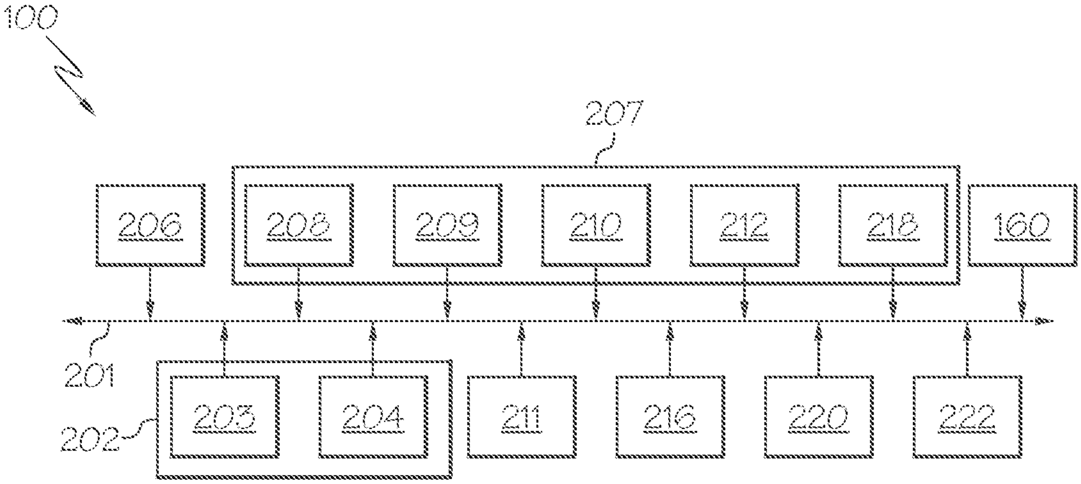
FIG. 7 schematically depicts various communicatively coupled modules of a multifunction mobility device, according to one or more embodiments shown and described herein.
Figure 8:
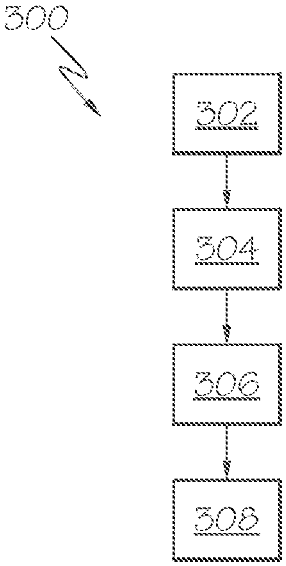
FIG. 8 depicts a method of converting the multifunction mobility device between a plurality of modes, according to one or more embodiments shown and described herein.

The handle 107 coupled to the first wheeled leg member **110*a* may be associated with controlling motion of a wheel 108*a* and/or 108*b* of the first wheeled leg member 110*a*, and the handle 107 coupled to the second wheeled leg member 110*b* may be associated with controlling motion of a wheel 108*a* and/or 108*b* of the second wheeled leg member 110*b*. During use, such as in the power wheelchair mode 100A depicted in FIGS. 2A and 2B, the power walker mode 100B depicted in FIGS. 3A and 3B, the power scooter mode 100C depicted in FIG. 4, etc., the handles 107 may be used to propel and/or steer the multifunction mobility device 100 by independently operating a motorized wheel of the plurality of motorized wheels of the multifunction mobility device 100. For example, the handle bar portion 132 may be communicatively coupled to one or more motors associated with wheels 108*a* and/or 108*b* of each wheeled leg member 110*a*. For example, the handle bar portion 132 may be grasped by a user and rotated or pivoted about the second rotational joint 136 to cause the multifunction mobility device 100 to be propelled via rotation of the wheels 108*a*, 108*b*. The user may use each handle bar portion 132, similar to a zero-turn mower, to move forward, in reverse, and/or turn. Accordingly, each handle bar potion 132 may be separately articulable about the second rotational joint 136 to move the multifunction mobility device 100 forward, backward, and/or to steer left or right. For example, to steer forward, each handle bar portion 132 may be rotated, by a user, in a forward direction. To steer backward, each handle bar portion 132 may be rotated or pulled backward. To move left or right, one handle bar portion 132 may be moved forward, while the other is either moved backward or maintained in a neutral position. In some embodiments, instead and/or in addition to rotating, pressure sensors may be associated with each handle 107 to detect pressure being exerted by the user on the handle 107. A control unit 202, such as schematically depicted in FIG. 7**, may determine, based on the pressure sensors, the intended motion of the user, and operate the motorized wheels according. It is noted that other steering mechanisms (e.g., buttons, throttle levers, or the like) are also contemplated and possible.

Referring again to FIGS. 1, 2A, and 2B, the multifunction mobility device 100 further includes the seat member 140. The seat member 140 may generally include a support substrate 142 and a seat module 150. The support substrate 142 may define a support platform 146, a first attachment arm **148*a* extending from one side of the support platform 146, and a second attachment arm 148*b* extending from an opposite side of the support platform 146. Each of the first attachment arm 148*a* and the second attachment arm 148*b* may be pivotally coupled to a distal end 115 of the upper leg portion 112 of the first wheeled leg member 110*a* and the second wheeled leg member 110*b*, respectively. The support substrate 142 may support the seat module 150 thereon. In some embodiments, and as will be described in greater detail below, the support substrate 142 may support a sliding motion of the seat module 150 toward and/or away from the attachment arms 148*a*, 148*b* to transform a position of the seat module 150** between the various modes, and/or in response to user adjustments.

The seat module 150 may include a base seat portion 152 that defines a base support surface 155 (depicted in FIG. 2A) for supporting a seated user thereon, and a back rest 154 pivotally coupled to the base seat portion 152. The back rest 154 may be pivotable toward and away from the back rest 154 so as to be able to selectively overlay the base support surface 155 of the base seat portion 152, such as in modes where the seat module 150 is not used to support a seat user (e.g., the power walker mode 100B, the power scooter mode 100C, the cargo transport mode 100D, and the collapsed transport and storage mode 100E). As will be described in greater detail below, one or more seat actuators may be coupled to the seat module 150 to transition the seat module 150 between an open position and a closed position in accordance with the various modes and/or as desired by the user.

In some embodiments, formed within the seat module 150, such as within the back rest 154 may be a telecommunication module 160. The telecommunication module 160 may facilitate telecommunications and may include, for example, a camera, a speaker, a microphone, and/or a display device, for providing telepresence/video conferencing functionality. The camera, speaker, microphone, and/or display device may be mounted to a back surface of the back rest 154. Accordingly, in some embodiments, a user may use the multifunction mobility device 100 as a telepresence device for communicating with others. In embodiments, the telecommunication module 160 may include communication chips, antennas, or the like to allow the telecommunications module to communicate with others via, for example, a cellular network, WiFi, or the like.

Figure 2A:
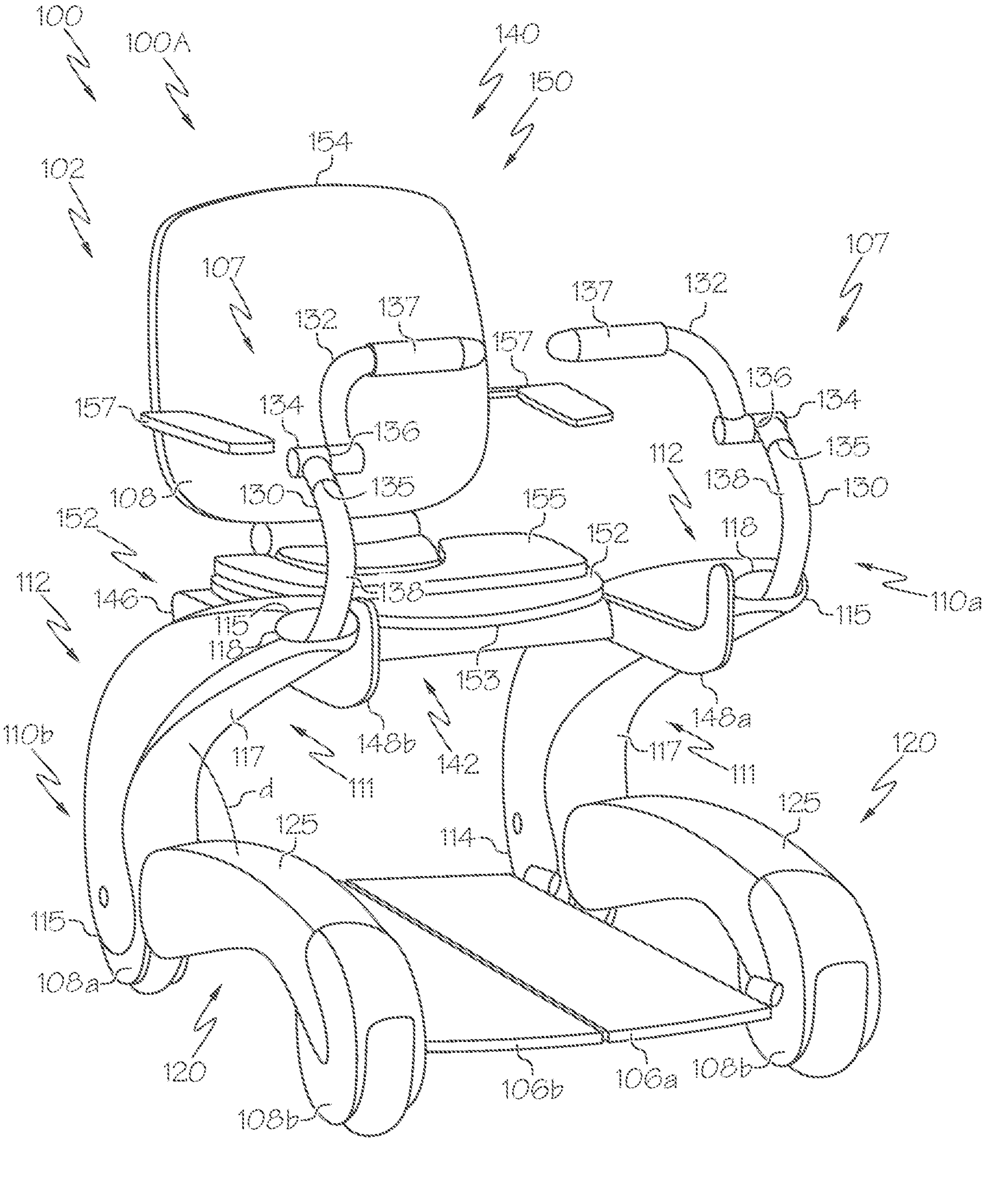
FIG. 2A schematically depicts a front view the multifunction mobility device in a power wheelchair mode, according to one or more embodiments shown and described herein.
Figure 2B:
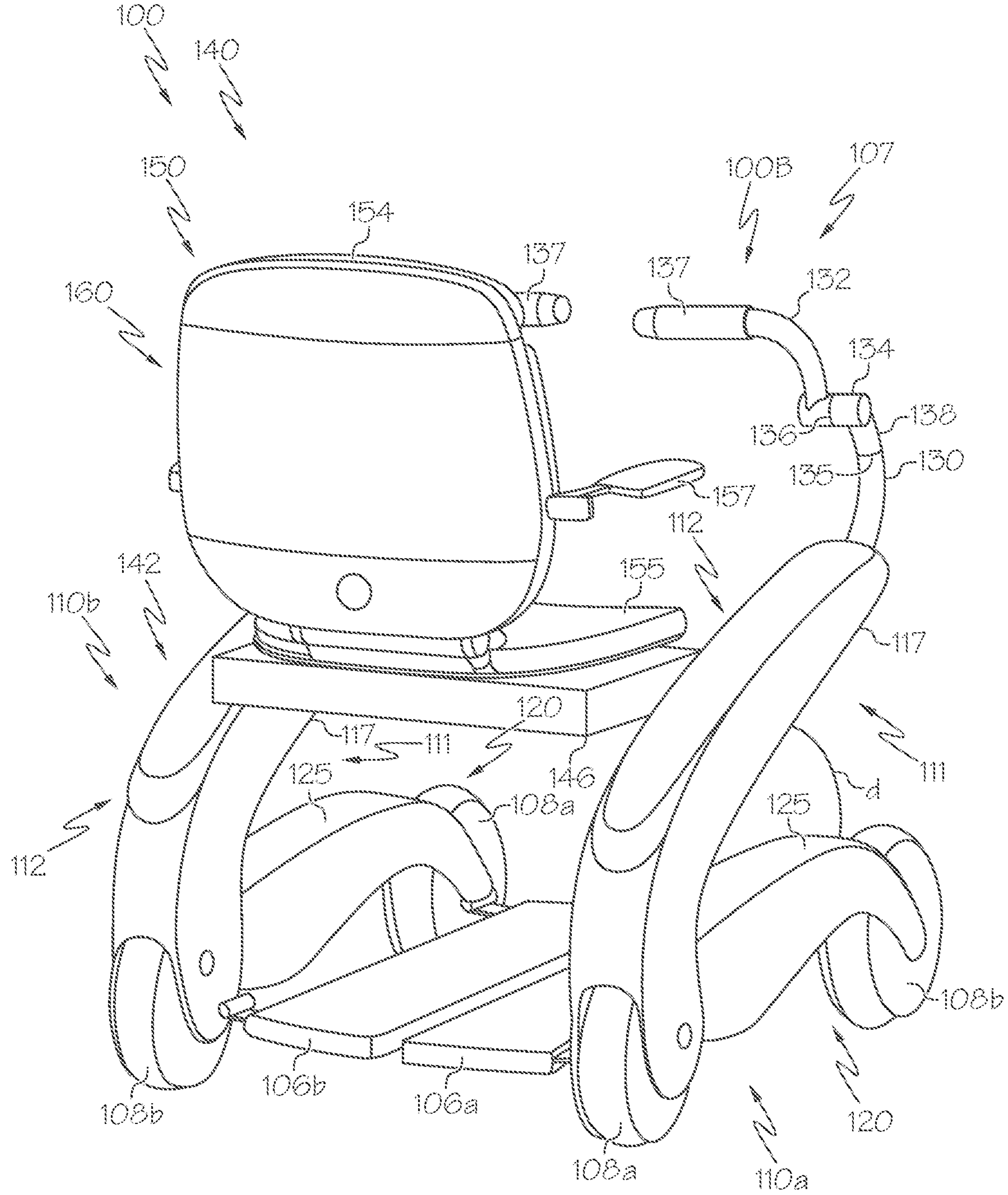
FIG. 2B schematically depicts a rear view of the multifunction mobility device of FIG. 2A, according to one or more embodiments shown and described herein.
Figure 3A:
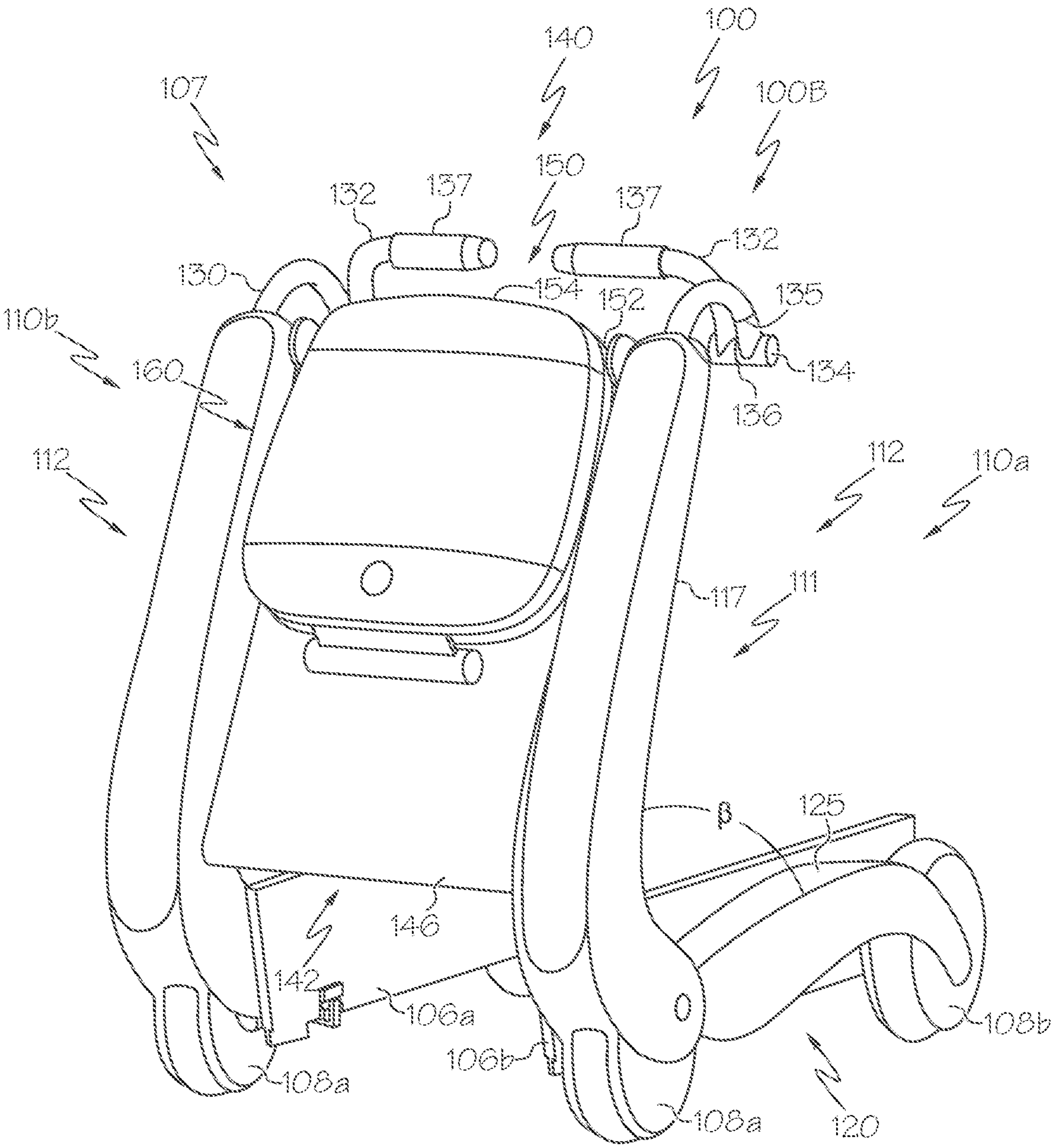
FIG. 3A schematically depicts a front view of a multifunction mobility device in a power walker mode, according to one or more embodiments shown and described herein.
Figure 3B:
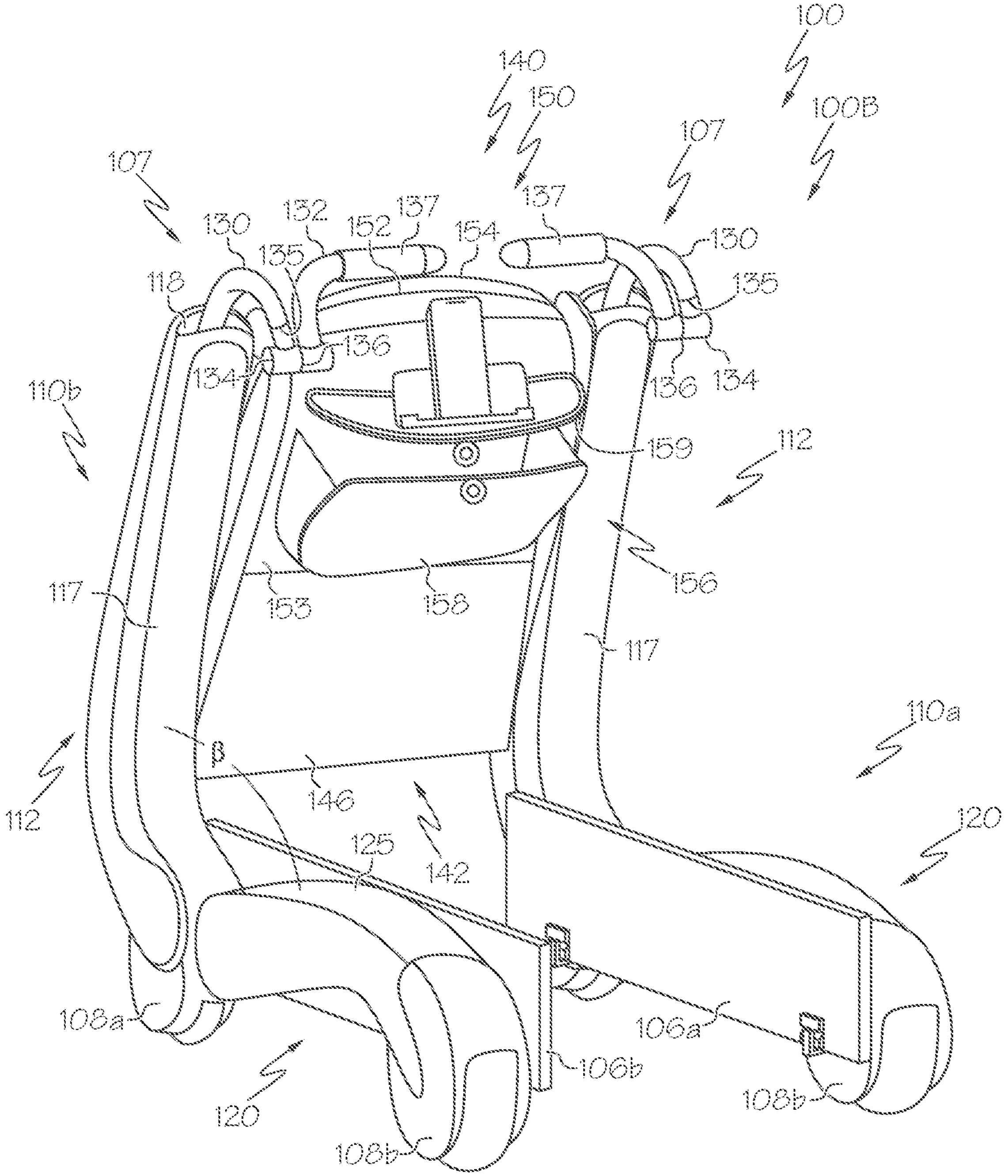
FIG. 3B schematically depicts a rear view of the multifunction mobility device of the 3A, according to one or more embodiments shown and described herein FIG. 4 schematically depicts a multifunction mobility device in a power scooter mode, according to one or more embodiments shown and described herein.

The multifunction mobility device 100 may further include a pair of foot plates 106*a*, 106*b*. Each foot plate 106*a*, 106*b* may be coupled to a corresponding one of the wheeled leg members 110*a*, 110*b* and rotatably attached thereto. Each foot plate 106*a*, 106*b* may have one or more hinges for rotatably attaching each foot plate 106*a*, 106*b* to a corresponding wheeled leg member 110*a*, 110*b*, for example, the lower leg portions 120. The foot plates 106*a*, 106*b* are operable to move between a horizontal position, as shown in FIGS. 2A and 2B, and a folded or upright position, as shown in FIGS. 3A and 3B. When the foot plates 106*a*, 106*b* are in the unfolded position, the upper surface faces an upward direction and the lower surface faces an opposite downward direction. The foot plates 106*a*, 106*b* are configured to support a user and/or cargo being transported thereon. Each foot plate 106*a*, 106*b* may be manually operated to position the foot plates 106*a*, 106*b* between the unfolded position and the folded position. However, in embodiments, the foot plates 106*a*, 106*b* may include a one or more footplate actuators (such as schematically depicted in FIG. 7), which may include any suitable powered mechanism such as, for example, rotational actuator, for automatically positioning the foot plates 106*a*, 106*b* between the unfolded position and the folded position. When the foot plates 106*a*, 106*b* are powered, the foot plates 106*a*, 106*b* may be operated by utilizing a control unit 202 on the handles 107 or some other user input device.

Referring now to FIGS. 2A and 2B, an example power wheelchair mode 100A of the multifunction mobility device 100 is schematically illustrated. FIG. 2A is a front view and FIG. 2B is a rear view. As illustrated, the first wheeled leg member 110*a* is coupled to a first side of the seat member 140 and the second wheeled leg member 110*b* is coupled to a second side of the seat member 140. In the power wheelchair mode 100A, upper leg portions 112 of the first wheeled leg member 110*a* and the second wheeled leg member 110*b* are angularly spaced from the low leg portions by an angle, α. Additionally, the support substrate 142 is pivoted to be arranged generally horizontally to the ground and the seat module 150 is moved to an open position such that the back rest 154 is positioned vertically or substantially orthogonal to the base seat portion 152 and/or the support substrate 142. However, it is contemplated that the back rest 154 may be reclined relative to the base seat portion 152 as desired by a user. As noted above, in some embodiments, the back rest 154 may be hingedly coupled to the seat module and such hinged coupling may be motorized such that it is able to move the seat module 150 from on open position to a closed position via input by a user and/or automatically during transformation from one mode to another.

Additionally, as illustrated in FIGS. 2A and 2B, extending from the back rest 154 may be arm rests 157 on which a user may rest their arms. It is contemplated that the arm rests 157 may be pivotable with respect to the back rest 154 so as to pivot between a deployed position, such as illustrated in FIGS. 2A and 2B, and a collapsed transport and storage mode, to allow the seat module 150 to fold to the closed position as illustrated in FIG. 1. Similar to other portions of the multifunction mobility device 100, the movement of the arm rests 157 may be motorized such that the arm rests 157 are automatically deployed when the multifunction mobility device 100 is moved to the power wheelchair mode 100A.

As also illustrated in FIGS. 2A and 2B, in the power wheelchair mode 100A, the foot plates 106*a*, 106*b* may be moved to the unfolded position. In the unfolded position, a user may rest their feet on the foot plates 106*a*, 106*b*. In some embodiments, the foot plates 106*a*,106*b* may be used to also store articles under the seat member 140.

In the power wheelchair mode 100A, the handles 107 may be positioned to allow a user to operate the multifunction mobility device 100 from a seated position. In such embodiment, the curved end of the base bar portion 130 may be curved toward the seat module 150 and the handle bar portions 132 may extend inward, toward one another. In some embodiments, it is contemplated that in the power wheelchair mode 100A, there maybe an ingress or egress sub-mode wherein the handle bar portions 132 are rotated away from one another to allow a user to enter and sit on the seat module 150. In some embodiments, only one of the handle bar portions 132 may rotate outward to allow for ingress or egress.

Referring now to FIGS. 3A and 3B, an example power walker mode 100B of the multifunction mobility device 100 is schematically illustrated. In the power walker mode 100B, the upper leg portions 112 of the wheeled leg members 110*a*, 110*b* are rotated from the lower leg portions 120 by an angle β, which is larger than the angle α of the power wheelchair mode 100A. In the power walker mode 100B, the seat member 140 may be moved out of the way to allow a user to stand between the first wheeled leg member 110*a* and the second wheeled leg member 110*b*. For example, and as illustrated the back rest 154 may be pivoted relative to the base support surface 155 to a closed position. The support substrate 142 may rotate to a non-horizontal position, which may be substantially aligned between the upper leg portions 112 of the first wheeled leg member 110*a* and the second wheeled leg member 110*b*. The support substrate 142 may be rotated to the same angle β as the upper leg portions 112 or may be a different angle. As noted herein, the seat module 150 may be slidingly coupled to the support substrate 142. In embodiments, the one or more seat actuators may include a linear actuator that may be controlled, e.g., via the control unit, to slide the seat module 150 relative to and across the support substrate 142. For example, when in the power walker mode 100B, the seat module 150 may be slid toward the distal end 115 of the upper leg portions 112, as opposed to toward the proximal end in the power wheelchair mode 100A.

Referring specifically to FIG. 3B, a back surface 153 of the base seat portion 152 of the seat module 150 is depicted. Mounted to the back surface 153 may be one or more storage devices 156. For example, the one or more storage devices 156 may include a storage compartment 158. such as, for example, a flexible cargo net, bag, or the like. The storage compartment 158 may be sealed via one or more fasteners (e.g., buttons, zippers, Velcro, magnets, or the like) to allow for retention of stored items (e.g., personal items such as books, wallets, keys, etc.) no matter the mode of the multifunction mobility device 100. In some embodiments, the one or more storage devices 156 may include a shelf 159 on which a user may rest one or more personal articles such as a mobile phone, a table, book, or the like. When in the power wheelchair mode 100A, such as illustrated in FIGS. 2A and 2B, the one or more storage devices 156 may slide into a hollow, not depicted, formed within the support substrate 142. For example, the shelf 159 and/or the storage compartment 158 may fold or collapse to slide within the hollow of the support substrate 142.

In the power walker mode 100B, the foot plates 106*a*, 106*b* are raised into the folded position, wherein the upper surface faces the corresponding wheeled leg member 110*a*, 110*b* to which it is rotatably coupled, while the lower surface of the foot plates 106*a*, 106*b* faces away from the adjoined wheeled leg member and toward the opposite wheeled leg member. In this way, a user can walk while holding onto the handles 107.

The orientation of the handles 107 are also adjusted in the power walker mode 100B. For example, and as illustrated the curved end 138 of the base bar portion 130 may be rotated to face away from the seat portion toward a position of the user and the handle bar portions 132 are rotated to face one another, though it is contemplated the handles 107 could face away from one another. In the power walker mode 100B, the user may push or pull the handle 107 bars, similar to driving the multifunction mobility device 100 in the power wheelchair mode 100A.

In some embodiments, the power walker mode 100B may be configured to provide adjustable or selectable levels of resistance and/or assistance to a user such that the power walker mode 100B may be used as a rehabilitation device or to provide aid to a user as needed. For example, in some embodiments, the motor of the wheels 108*a*, 108*b* may provide more or less assistance in moving the multifunction mobility device 100. In other embodiments, the motor may actively resist rotational motion of the wheels 108*a*, 108*b*, and/or braking disks or the like, may provide active resistance to the turning of the wheels 108*a*, 108*b*. As will be described in more detail herein, in some embodiments, the multifunction mobility device 100 may include sensors (e.g., cameras, motion sensors, or the like, to determine a terrain type (e.g., rocky, smooth, etc.) over which the multifunction mobility device 100 is traveling. Based on the terrain type, the level of assistance or resistance to motion may be adjusted. Such adjustments may also help a user maintain their balance and/or speed when moving from one terrain type to another. For example, when moving up hill or over uneven terrain, it may be more difficult for a user to push the multifunction mobility device 100 in the power walker mode 100B. Accordingly, the level of assistance may be increased (or the level of resistance decreased) to aid a user in crossing the terrain. In yet further embodiments, a user may have a user profile which may be used to actively adjust resistance and/or assistance in accordance with an associated user profile. For example, a user with a tendency to drift to one side may be provided with increased resistance on that side, or increased assistance on the opposite side, to prevent unwanted drifting from one side to another. In yet further embodiments, the level of resistance and/or assistance may be selected by a user or care provider (e.g., with the handles 107 or other input device) to set a level of resistance and/or assistance, such as during a rehabilitation exercise.

Figure 4:
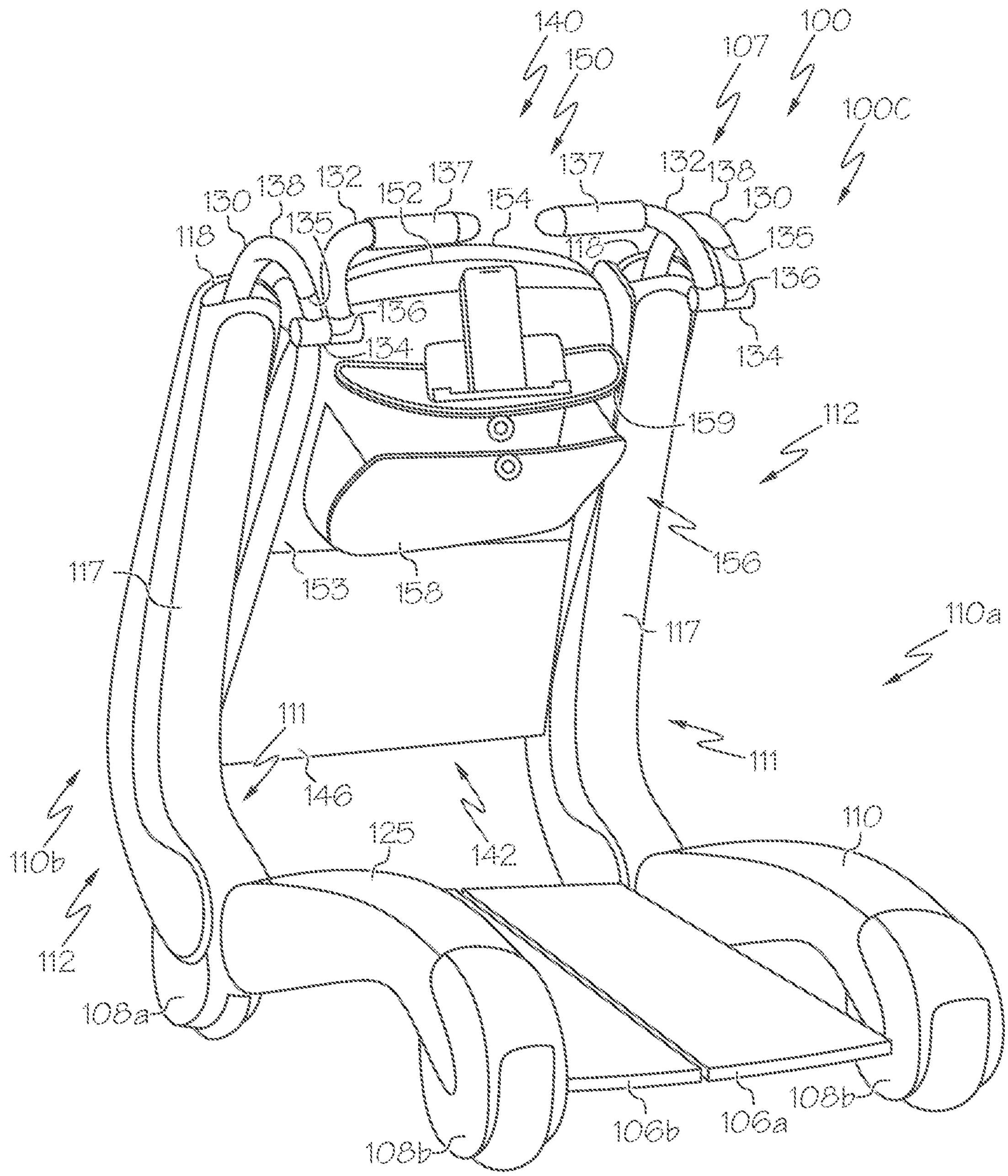

The power scooter mode 100C is illustrated in FIG. 4. The power scooter mode 100C may be substantially similar to the power walker mode 100B. However, in the power scooter mode 100C, the foot plates 106*a*, 106*b* may lower to the unfolded position to allow a user (not shown) to stand upon the foot plates 106*a*, 106*b* to ride the multifunction mobility device 100 while grasping the handles 107, which may be operated in a manner similar to that described above. In some embodiments, it is contemplated that the position of the handles 107 may also be substantially similar to that of the power walker mode 100B. However, in some embodiments, the handle bar portion 132 may be rotated to be positioned closer to the user. In some embodiments, the base bar portion 130 may extend from the second end 115 of the upper leg portions 112 by a greater distance to position the handles 107 closer to the user. In each of the various modes the position of the handles 107 may be adjusted to the comfort of the user and/or to accommodate various sized users.

Figure 5:
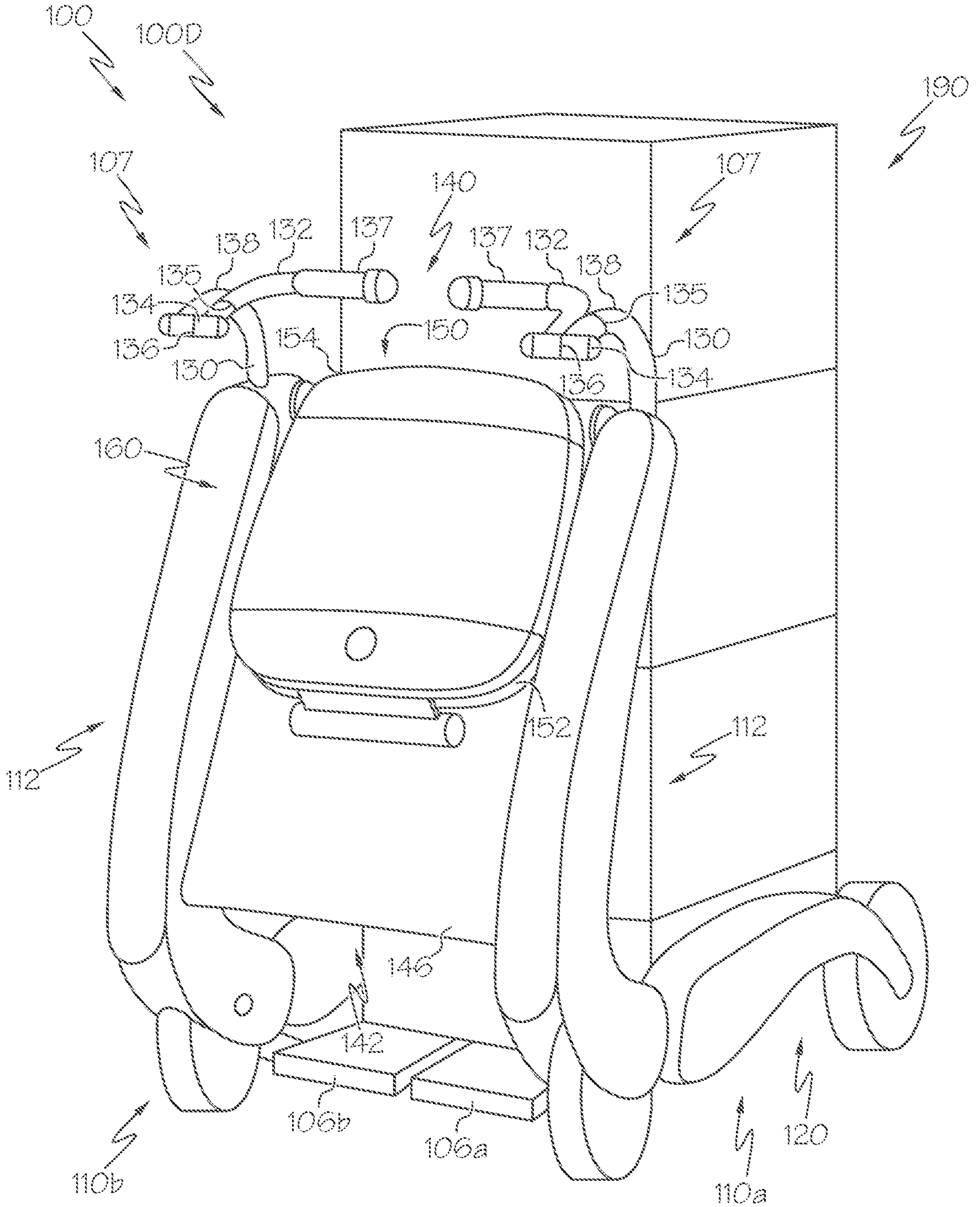
FIG. 5 schematically depicts a multifunction mobility in a cargo transport mode, according to one or more embodiments shown and described herein.

Referring now to FIG. 5, the multifunction mobility device 100 is depicted in a cargo transport mode 100D, which may be used to transport one or more storage containers 190 (e.g., boxes). The cargo transport mode 100D is substantially similar to the power scooter mode 100C, however, the foot plates 106*a*, 106*b* may be used to support the one or more storage containers 190. In this mode, the handles 107 may be positioned out of the way of the one or more storage containers 190. For example, the base bar portions 130 of the handles 107 may be rotated such that the curved end 138 curves outward toward the seat portion and/or away from the one or more storage containers 190. The handle bar portions 132 may be positioned to extend toward one another and may be extend toward (as shown) or away from the one or more storage containers 190.

Figure 6A:
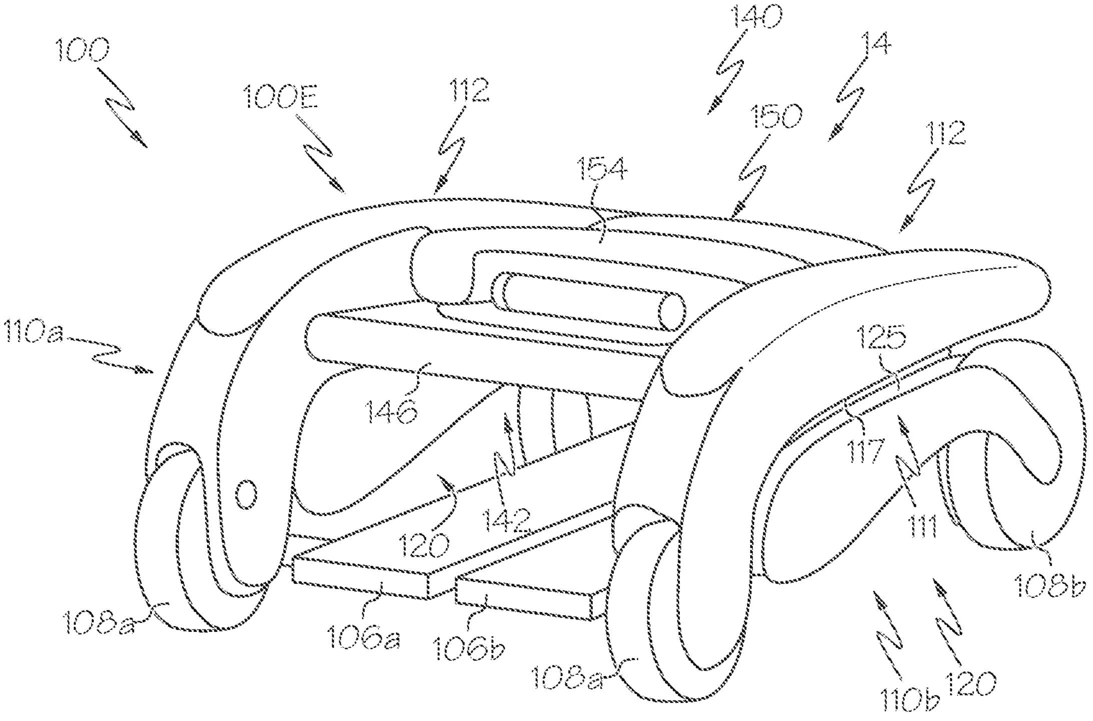
FIG. 6A schematically depicts rear view of a multifunction mobility device of a collapsed transportation and storage mode, according to one or more embodiments shown and described herein.
Figure 6B:
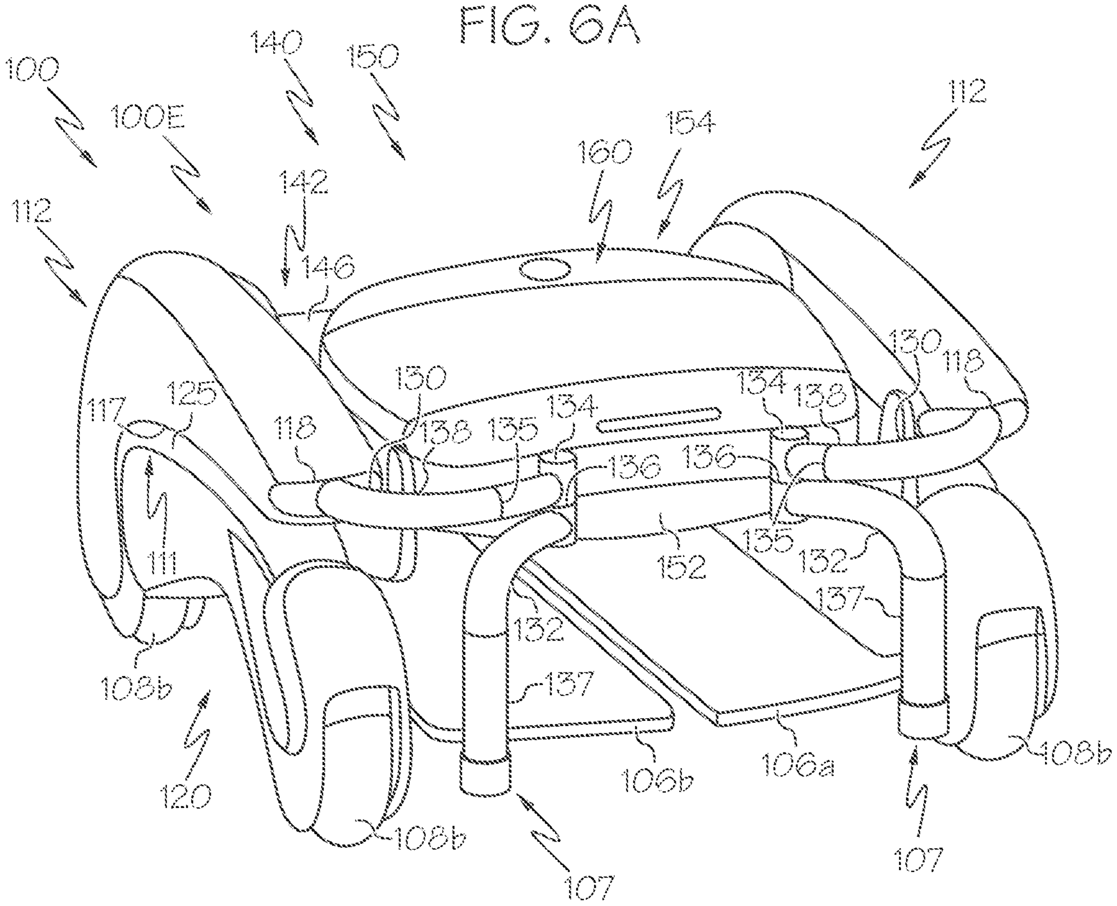
FIG. 6B schematically depicts a front view of the multifunction mobility device of FIG. 6A, according to one or more embodiments shown and described herein.

FIGS. 6A and 6B depict the multifunction mobility device 100 in the collapsed transport and storage mode 100E. In the collapsed transport and storage mode 100E, the multifunction mobility device 100 may be utilized to transport smaller objects, such as where a lower or smaller profile would be needed, such as through a tunnel or other area with a low ceiling. In some embodiments, the collapsed transport and storage mode 100E, is also the mode most adapted for storage due to its compact configuration that can fit into smaller spaces than the other modes discussed above. In the collapsed transport and storage mode 100E, the upper leg portions 112 of the first and second wheeled leg members 110*b* are pivoted relative to the lower leg portions 120 such that the lower leg portion 120 nests into the upper arm recess 111, such that the curved upper surface 125 of the lower leg is closely positioned with the curved wall 117 of the upper leg portion 112. Additionally, in the collapsed transport and storage mode 100E, the seat member 140 may be arranged generally horizontal to the foot plates 106*a*, 106*b* which may be positioned in the unfolded position. As illustrated, the seat module 150 may also be shifted in the toward the distal end 115 of the upper leg portions 112 similar to the power scooter and power walker modes described above. The handles 107 may also have a designated position for the collapsed transport and storage mode 100E. For example, the curved end 138 of the base bar portions 130 may be rotated inward to face one another and the handle 107 bar portions may be positioned to extend downward in a direction of the foot plates 106*a*, 106*b*

From the collapsed transport and storage mode 100E that multifunction mobility device 100 may be transitioned (either manually or through automated actuation via a plurality of actuators 207) to any of the other modes, via increasing the angular distance between the lower leg portion 120 and the upper leg portion 112, adjusting a position of the handles 107, adjusting the foot plates 106*a*, and/or adjusting a position of the seat portion. As noted herein, such transitions may be manually achieved or may be motorized and controlled via a control unit 202. For example, FIG. 7 schematically depicts various components of the multifunction mobility device 100 communicatively coupled to one another. The multifunction mobility device 100 may include, a communication path 201, a control unit 202 (including one or more processors 203 and/or one or more memory modules 204), one or more motors 206, one or more actuators 207 (e.g., one or more leg actuators 208, one or more handle actuators 209, one or more seat actuators 210, one or more foot plate actuators 212, one or more resistance actuators 218, or the like), the telecommunication module 160, one or more mode sensors 216, one or more terrain sensors 211, and one or more user sensors 220, the handles 107, and/or one or more additional user interface devices 222. In some embodiments, a greater or fewer number of modules may be included without departing from the scope of the present disclosure.

The communication path 201 may be formed from any medium that is capable of transmitting a signal such as, for example, conductive wires, conductive traces, optical waveguides, or the like. Moreover, the communication path 201 may be formed from a combination of mediums capable of transmitting signals. In one embodiment, the communication path 201 comprises any combination of conductive traces, conductive wires, connectors, and buses that cooperate to permit the transmission of electrical data signals to components such as processors, memories, sensors, input devices, output devices, and communication devices. Accordingly, the communication path 201 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 201 communicatively couples the various components of the multifunction mobility device 100. As used herein, the term "communicatively coupled" means that coupled components are capable of exchanging data signals with one another such as, for example, electrical signals via conductive medium, electromagnetic signals via air, optical signals via optical waveguides, and the like.

As noted above, the control unit 202 may include one or more processors 203 and one or more memory modules 204. The one or more processors 203 of the multifunction mobility device 100 may include any device capable of executing machine-readable instructions. Accordingly, the one or more processors 203 may be a controller, an integrated circuit, a microchip, a computer, or any other computing device. The one or more processors 203 may be communicatively coupled to the other components of the multifunction mobility device 100 by the communication path 201, such as the various modes 100A-E depicted in FIGS. 2A-6B. For example, the control unit 202 with the one or more processors 203 may be configured to operate the plurality of actuators 207 to transition the multifunction mobility device 100 between the plurality of different modes and/or application of resistance as noted above. Accordingly, the communication path 201 may communicatively couple any number of processors 203 with one another, and allow the components coupled to the communication path 201 to operate in a distributed computing environment. Specifically, each of the components may operate as a node that may send and/or receive data.

Still referring to FIG. 7, the one or more memory modules 204 of the multifunction mobility device 100 is coupled to the communication path 201 and communicatively coupled to the one or more processors 203. The one or more memory modules 204 may, for example, store instructions for adjusting components of the multifunction mobility device 100 to the various modes, adjusting applied resistance or assistance for a user when in a walker mode, etc. The one or more memory modules 204 may comprise RAM, ROM, flash memories, hard drives, or any non-transitory memory device capable of storing machine-readable instructions such that the machine-readable instructions can be accessed and executed by the one or more processors 203. The machine-readable instructions may comprise logic or algorithm(s) written in any programming language of any generation (e.g., 1 GL, 2 GL, 3 GL, 4 GL, or 5 GL) such as, for example, machine language that may be directly executed by the one or more processors 203, or assembly language, object-oriented programming (OOP), scripting languages, microcode, etc., that may be compiled or assembled into machine-readable instructions and stored in the one or more memory modules 204 Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

As noted above, each of the wheels 108*a*, 108*b* of the multifunction mobility device 100 may be motorized via one or more motors 206. The control unit 202 is communicatively coupled to the one or more motors 206 to cause rotation of the wheels 108*a*, 108*b* with the one or more motors 206. It is noted that only a portion of the wheels 108*a*, 108*b* may be motorized while the remainder wheels may be caster wheels. The control unit 202 may be communicatively coupled to the handles 107 such that operation (e.g., press and/or pulling) on the handles 107 causes the control unit 202 to operate the motors as indicated by the inputs on the handles 107, as described above. In some embodiments, it is contemplated that the control unit 202 may drive the multifunction mobility device 100 autonomously via one or more sensors (e.g., radar, lidar, cameras, proximity sensors, GPS data, etc.).

As noted above, the one or more actuators 207 may include any number of actuators 207 that cause and/or restrict motion of multifunction mobility device 100. For example, and as noted above, the one or more actuators 207 may include one or more leg actuators 208, one or more seat actuators 210, one or more foot plate actuators 212, one or more handle actuators 209, one or more resistance actuators 218, or the like. The one or more leg actuators 208 may be coupled to the upper leg portion 112 and the lower leg portion 120 and cause the upper leg portion 112 and the lower leg portion 120 to pivot relative to one another. For example, the one or more leg actuators 208 may include a rotational actuator and/or a linear actuator that pivots the upper leg portion 112 relative to the lower leg portion 120 to increase or decrease an angle between the upper leg portion 112 and the lower leg portion 120 to transition the multifunction mobility device 100 between each of the various modes discussed herein.

The one or more seat actuators 210 may include any number of rotational and/or linear actuators. For example, a rotational actuator may be coupled to the support platform 146 and cause the support platform 146 to rotate relative to the upper leg portion 112 between the various modes. In some embodiments, the seat module 150, such as the base seat portion 152 may be coupled to a linear actuator that causes the base seat portion 152 to slide across the support substrate 142 when transitioning between the various mobility modes. In some embodiments, the one or more seat actuators 210 may include a rotational actuator between the back rest 154 portion and the base seat portion 152 to allow the control unit 202 to move the seat from an open position such as illustrated in FIG. 2A to a closed position such as illustrated in the power scooter, power walker, cargo transport, and collapsed transport and storage modes. It is noted that in some embodiments the arm rests 157 may also have actuators to allow for automated deployment of the arm rests 157 when the multifunction mobility device 100 transitions to the power wheelchair mode 100A.

The one or more handle actuators 209, may similarly include any number of rotational and/or linear actuators to allow the control unit 202 to automatically transition the handles 107 to positions corresponding to the various modes, as described above. For example, the base bar portion 130 may be coupled to a linear actuator that allows the base bar to move linearly within the handle opening 118 formed in the upper leg portion 112. A rotational actuator may also allow the base bar portion 130 to rotated within the handle opening 118. Similarly, one or more actuators 207 may also be coupled to the handle bar portion 132 to rotate the handle bar portion 132 relative to the base bar portion 130 about the first rotational joint 135 and/or the second rotational joint 136.

The one or more foot plate actuators 212, may be coupled to the one or more foot plates 106*a*. Logic executed by the control unit 202 may cause the one or more foot plate actuators 212 to move the foot plates 106*a* from a folded position, as described herein, to an unfolded position. For example, the one or more foot plate actuators 212 may be rotation actuators or linear actuators that cause the foot plates 106*a* to rotate between the open and closed positions.

As noted above, the multifunction mobility device 100 may include one or more resistance actuators 218. As described above, when in the power walker mode 100B, it may be desirable to apply active resistance to a user's motion and/or provide more or less assistance to the user. The one or more resistance actuators 218 may include one or more braking discs, e.g., friction and/or magnetic brakes. In some embodiments, the one or more resistance actuators 218 may be provided via the one or more motors 206 for the wheels 108*a*, 108*b*. For example, the one or more motors 206 may be operated to provide selective levels of resistance or assistance to a user, as described above. In some embodiments, the control unit 202 may operate left and/or right wheels of the multifunction mobility device 100 to straighten alleviate a user's applied bias. For example, where a user favors one side or is stronger on one side, a greater level of resistance may be provided to that side of the multifunction mobility device 100 or a greater level of assistance may be applied to the opposite side to allow the user to travel along a straight path.

In embodiments and as described above, the one or more terrain sensors 211 may output indications of the terrain of the environment of the multifunction mobility device 100. For example, terrain sensors 211 may include, but are not limited to accelerometers, gyroscopes, cameras, GPS data, or the like. The control unit 202 may determine based on the output of the one or more terrain sensors 211 when the user is traveling over a smooth or rough surface, a slope of the terrain, or the like. Based on the type of surface, the control unit 202 may adjust the resistance and/or assistance provided the multifunction mobility device 100, using the one or more resistance actuators 218. By adjusting the resistance and/or assistance provided to the user, the user may more easily and/or steadily travel over the type of terrain.

The one or more mode sensors 216 may include any number of sensors operable to detect the mode of the multifunction mobility device 100. For example, the one or more mode sensors 216 may include hall effect sensors, light sensors, detent sensors, accelerometers, potentiometers, speed sensors, gyroscopes, or the like. The control unit 202 may determine the mode of the multifunction mobility device 100 based on the output of the one or more mode sensors 216. Based on the mode of the multifunction mobility device 100, certain operating parameters may be adjusted. For example, adjustments may be made to speed, acceleration, directional inputs from the handles 107, to match the type of mode the multifunction mobility device 100 is positioned in.

The one or more additional user interface devices 222 may include any number of devices (e.g., knobs, buttons, keyboards, microphones, touchscreens, remote devices, gesture detection devices, etc.) that allow a user to input preferences, requests, and/or settings into the control unit 202 of the multifunction mobility device 100. For example, a user, using the one or more additional user interface devices 222 may transition the multifunction mobility device 100 to the desired mode. The one or more additional user interface devices 222 may further allow a user to adjust desired settings, e.g., seat position, recline, handle 107 position, resistance, assistance, or the like. In some embodiments, these one or more additional user interface devices 222 may be incorporated into the handles, the seat module 150, etc.

In some embodiments, it is contemplated that the multifunction mobility device 100 may have one or more user sensors 220 to detect one or more characteristics of a user (e.g., identity, height, weight, medical history, etc.) which may allow the control unit 202 to dynamically and automatically adjust settings (e.g., seat position, handle 107 position, etc.) based on the one or more characteristics of the user. In some embodiments, the control unit 202 may, using the one or more characteristics of the user identify certain movement characteristics associated with the user. For example, using the one or more user sensors 220, the control unit 202 may identify user tendencies, such as, for example, a user tendency to apply greater force to the handle versus the other, which may result in a swaying motion or being unable to travel in a consistent travel direction, The control unit 202 may adjust settings of accommodate such tendencies to ensure proper travel direction, such as described above.

As noted herein, the multifunction mobility device 100 may further include a telecommunication module 160. The telecommunication module 160 may include one or more communication modules (e.g., antennas, satellites, chips, etc.) for communicating via a network, e.g., a cloud network, cellular network, or the like, to remote locations. The telecommunication module 160 may further, as noted above, include a display, camera, speaker, and/or microphone to allow a user to communicate and/or video conference with others. The multifunction mobility device 100 may be used as a telecommunications device in any of the provided transportation modes.

FIG. 9 schematically depicts a flow chart depicting a method 300 for converting a multifunction mobility device 100 according to one or more of the various embodiments described herein to a desired mode. A greater or fewer number of steps may be included without departing from the scope of the present disclosure. The method 300, at block 302, may include receiving, with the control unit 202, an input via one or more user input devices (e.g., the handles 107 or the one or more other user input devices 222) to convert the multifunction mobility to one of the plurality of modes (e.g., power wheelchair mode 100A, power walker mode 100B, power scooter mode 100C, cargo transport mode 100D, and/or the collapsed transport and storage mode 100E). At block 304, the method 300 may include automatically adjusting the multifunction mobility device 100 with one or more actuators 207 to transform the multifunction mobility device 100 to the selected mode. That is, the one or more leg actuators 208 may be controlled via the control unit 202 to pivot the upper leg portion 112 relative to the lower leg portion 120, the one or more seat actuators 210 may be controlled to adjust a position of the support substrate 142 and/or the seat module 150, the one or more handle actuators 209 may be used to adjust a position of the one or more handles 107, and/or the one or more foot plate actuators 212 may be controlled to adjust a position of the foot plates 106*a*. In some embodiments, a portion of the multifunction mobility device 100 may be automatically adjusted between modes and some portions may be manually adjusted. For example, the first and second wheeled leg members 110*a*, 110*b* the seat member 140, and/or the handles 107 may be automatically adjusted, while the foot plates 106*a*, 106*b* may be manually adjusted. Though other combinations are contemplated and possible.

At block 306, the method 300 may further include identifying one or more user characteristics with the one or more user sensors 220, and adjusting the multifunction mobility device 100 based on the one or more user characteristics, as described in greater detail above. For example, the various components of the multifunction mobility device 100 may be further adjusted based on a user preference, a user characteristic, or the like. At block 308, the method 300 may include, where the multifunction mobility device 100 is positioned within a power walker mode 100B, determining a level of resistance and/or a level of assistance to be provided by the multifunction mobility device 100 (e.g., which may be identified via identification of the user and/or input by a user via one or more user input device) and adjusting the resistance and/or assistance applied to one or more wheels 108*a*, 108*b* of the multifunction mobility device 100 to adjust a level of resistance and/or assistance provided to the user in moving the multifunction mobility device 100 when positioned in the power walker mode 100B.

It should now be understood that embodiments as described herein are directed to multifunctional mobility device that are reconfigurable between a plurality of different configurations or modes. For example, a multifunction mobility device according to the present disclosure may transform between, a collapsed transport and storage mode, a power wheelchair mode, a power walker/telepresence mode, a power scooter mode, and/or a cargo transport mode. Having such modes all within one device advantageously saves users from having to purchase and store many different mobility devices.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A multifunction mobility device, comprising:
- a frame that is configurable between a plurality of modes, the frame comprising:
- a seat member;
- a first wheeled leg member coupled to a first side of the seat member; and
- a second wheeled leg member coupled to a second side of the seat member, the first wheeled leg member and the second wheeled leg member each comprising:
- an upper leg portion extending between a distal end and a proximal end, the upper leg portion pivotally coupled to the seat member at the distal end and comprising a curved wall that defines an upper arm recess;
- a lower leg portion extending between a first end and a second end, the lower leg portion pivotally coupled to the upper leg portion at the first end, the upper leg portion and the lower leg portion being collapsible into a collapsed transport and storage mode where the upper leg portion is pivoted relative to the lower leg portion such that the lower leg portion nests into the upper arm recess and such that an end surface of the first end of the lower leg portion nests within the proximal end of the upper leg portion.

2. The multifunction mobility device of claim 1, wherein the seat member comprises:
- a support substrate pivotally coupled to the upper leg portion of each of the first wheeled leg member and the second wheeled leg member; and
- a seat module slidingly coupled to the support substrate, the seat module comprising:
- a base seat portion defining a base support surface for supporting a user thereon; and
- a back rest pivotally coupled to the base seat portion,
- wherein in the collapsed transport and storage mode, the back rest is pivoted to overlay the base support surface of the base seat portion and the seat module is positioned toward the distal end of the upper leg portions.

3. The multifunction mobility device of claim 2, wherein the frame is configurable in a power wheelchair mode, wherein:
- the upper leg portion of each of the first wheeled leg member and the second wheeled leg member pivots relative to the lower leg portion to increase an angular distance between the upper leg portion and the lower leg portion;
- the seat module is positioned toward the proximal end of the upper leg portion.

4. The multifunction mobility device of claim 2, wherein the frame is configurable in a power walker mode, wherein:

the upper leg portion of each of the first wheeled leg member and the second wheeled leg member pivots with respect to the lower leg portion to increase an angular distance between the upper leg portion and the lower leg portion; and the support substrate is positioned in substantial alignment between the upper leg portion of the first wheeled leg member and the upper leg portion of the second wheeled leg member.

5. The multifunction mobility device of claim 2, further comprising a first foot plate pivotally coupled to the first wheeled leg member and a second foot plate pivotally coupled to the second wheeled leg member, wherein each of the first foot plate and the second foot plate are pivotable between a folded position and an unfolded position, wherein the frame is configurable in a power scooter mode wherein:

the upper leg portion of each of the first wheeled leg member and the second wheeled leg member pivots relative to the lower leg portion to increase an angular distance between the upper leg portion and the lower leg portion from the collapsed transport and storage mode; and the first foot plate and the second foot plate are positioned in the unfolded position.

6. The multifunction mobility device of claim 1, further comprising a first handle and a second handle operatively coupled to one or more motors that rotate wheels of the first wheeled leg member and the second wheeled leg member.

7. The multifunction mobility device of claim 6, wherein the first handle is independent moveable from the second handle.

8. A multifunction mobility device, comprising:

a frame that is configurable between a plurality of modes, the frame comprising:

a seat member;

a first wheeled leg member coupled to a first side of the seat member; and a second wheeled leg member coupled to a second side of the seat member, the first wheeled leg member and the second wheeled leg member each comprising:

an upper leg portion extending between a distal end and a proximal end, the upper leg portion pivotally coupled to the seat member at the distal end and comprising a curved wall that defines an upper arm recess; and a lower leg portion extending between a first end and a second end, the lower leg portion pivotally coupled to the upper leg portion at the first end, the upper leg portion and the lower leg portion being collapsible into a collapsed transport and storage mode, wherein the upper leg portion is pivoted with respect to the lower leg portion such that the lower leg portion nests into the upper arm recess and such that an end surface of the first end of the lower leg portion nests within the proximal end of the upper leg portion;

one or more actuators that transition the frame between the plurality of modes; and a control unit communicatively coupled to the one or more actuators, wherein the control unit is configured to operate the one or more actuators to transition the frame between the plurality of modes including the collapsed transport and storage mode.

9. The multifunction mobility device of claim 8, wherein the seat member comprises:

a support substrate pivotally coupled to the upper leg portion of each of the first wheeled leg member and the second wheeled leg member; and a seat module slidingly coupled to the support substrate, the seat module comprising a base seat portion defining a base support surface configured to support a user thereon; and a back rest pivotally coupled to the base seat portion, wherein in the collapsed transport and storage mode, the back rest is pivoted to overlay the base support surface of the base seat portion and the seat module is positioned toward the distal end of the upper leg portions.

10. The multifunction mobility device of claim 9, wherein the frame is configurable in a power wheelchair mode, wherein:

the upper leg portion of each of the first wheeled leg member and the second wheeled leg member pivots relative to the lower leg portion to increase an angular distance between the upper leg portion and the lower leg portion to an angle;

the seat module is positioned toward the proximal end of the upper leg portion.

11. The multifunction mobility device of claim 9, wherein the frame is configurable in a power walker mode, wherein:

the upper leg portion of each of the first wheeled leg member and the second wheeled leg member pivots relative to the lower leg portion to increase an angular distance between the upper leg portion and the lower leg portion; and the support substrate is positioned in substantial alignment with the upper leg portion of the first wheeled leg member and the upper leg portion of the second wheeled leg member.

12. The multifunction mobility device of claim 9, further comprising a first foot plate pivotally coupled to the first wheeled leg member and a second foot plate pivotally coupled to the second wheeled leg member, wherein each of the first foot plate and the second foot plate are pivotable between a folded position and an unfolded position, wherein the frame is configurable in a power scooter mode wherein:

the upper leg portion of each of the first wheeled leg member and the second wheeled leg member is pivoted with respect to the lower leg portion to increase an angular distance between the upper leg portion and the lower leg portion from the collapsed transport and storage mode; and the first foot plate and the second foot plate are positioned in the unfolded position.

13. The multifunction mobility device of claim 8, further comprising a first handle and a second handle coupled to one or more motors which rotate one or more wheels of the first wheeled leg member and the second wheeled leg member.

14. The multifunction mobility device of claim 13, wherein the first handle is coupled to the first wheeled leg member and the second handle is coupled to the second wheeled leg member and the first handle is separately actuatable from the second handle.

15. A multifunction mobility device, comprising:

a frame that is configurable between a plurality of modes including at least a power wheelchair mode, a power walker mode, and a power scooter mode, the frame comprising:

a seat member;

a first wheeled leg member coupled to a first side of the seat member; and a second wheeled leg member coupled to a second side of the seat member, the first wheeled leg member and the second wheeled leg member each comprising:

an upper leg portion extending between a distal end and a proximal end, the upper leg portion pivotally coupled to the seat member at the distal end and comprising a curved wall that defines an upper arm recess;

a lower leg portion extending between a first end and a second end, the lower leg portion pivotally coupled to the upper leg portion at the first end, the upper leg portion and the lower leg portion being collapsible into a collapsed transport and storage mode, wherein the upper leg portion is pivoted relative to the lower leg portion to nest the lower leg portion into the upper arm recess and such that an end surface of the first end of the lower leg portion nests within the proximal end of the upper leg portion;

one or more actuators coupled to the frame; and a control unit communicatively coupled to the one or more actuators, wherein the control unit is configured to operate the one or more actuators to transition the frame into each mode.

16. The multifunction mobility device of claim 15, one or more resistance actuators communicatively coupled to the control unit, wherein the control unit is configured to adjust a level of resistance to motion of one or more wheels of the first wheeled leg member and/or the second wheeled leg member.

17. The multifunction mobility device of claim 15, wherein the seat member comprises:

a support substrate pivotally coupled to the upper leg portion of each of the first wheeled leg member and the second wheeled leg member; and a seat module slidingly coupled to the support substrate, the seat module comprising a base seat portion defining a base support surface configured to support a user thereon; and a back rest pivotally coupled to the base seat portion, wherein in the collapsed transport and storage mode, the back rest is pivoted to overlay the base support surface of the base seat portion and the seat module is positioned toward the distal end of the upper leg portions.

18. The multifunction mobility device of claim 17, further comprising one or more storage devices mounted to a back surface of the base seat portion, the one or more storage devices comprises a sealable storage compartment and/or a shelf.

19. The multifunction mobility device of claim 17, wherein in the power wheelchair mode:

the upper leg portion of each of the first wheeled leg member and the second wheeled leg member pivots relative to the lower leg portion to increase an angular distance between the upper leg portion and the lower leg portion to an angle;

the seat module is positioned toward the proximal end of the upper leg portion.

20. The multifunction mobility device of claim 17, wherein in the power walker mode:

the upper leg portion of each of the first wheeled leg member and the second wheeled leg member pivots relative to the lower leg portion to increase an angular distance between the upper leg portion and the lower leg portion; and the support substrate is positioned in substantial alignment with the upper leg portion of the first wheeled leg member and the upper leg portion of the second wheeled leg member.

* * * * *